United States Patent
Colegrove

(10) Patent No.: US 6,465,553 B2
(45) Date of Patent: Oct. 15, 2002

(54) GUM SLURRIES

(75) Inventor: George Thomas Colegrove, San Diego, CA (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/753,917

(22) Filed: Jan. 3, 2001

(65) Prior Publication Data

US 2002/0086919 A1 Jul. 4, 2002

(51) Int. Cl.[7] ............................. C08J 5/10; C08K 5/06
(52) U.S. Cl. ..................... 524/377; 524/378; 524/270
(58) Field of Search ................................ 524/377, 378, 524/270

(56) References Cited

U.S. PATENT DOCUMENTS 4,453,979 A * 6/1984 DeMasi et al. ............. 106/188
5,506,290 A * 4/1996 Shapero ....................... 524/389

* cited by examiner

*Primary Examiner*—James J. Seidleck
*Assistant Examiner*—U. K Rajguru
(74) *Attorney, Agent, or Firm*—Walter Katz; William J. Davis; Marilyn J. Maue

(57) ABSTRACT

A stable, non-aqueous gum slurry which can be readily pumped or metered into a given formulation without swelling the gum or causing an excessive increase in viscosity, comprising a gum, a low molecular weight liquid polyethylene glycol as a non-solvent, and dissolved therein, a high molecular weight, solid polyethylene glycol as viscosifier.

4 Claims, No Drawings

GUM SLURRIES

BACKGROUND OF THE INVENTION

1. Field of the Invention

This invention relates to gum slurries, and, more particularly, to stable, non-aqueous flowable gum slurries which do not increase in viscosity due to gum particle swelling and can be pumped conveniently into formulations.

2. Description of the Prior Art

Several gums have been the subject of patents pertaining to the preparation of high solids, liquid dispersions which are convenient to use, rapidly hydratable, and easy to pump in certain applications, where addition of ingredients to the final product is done by metered pumping. In most cases these gums are suspended in a solvent wherein the gum will not dissolve, and are simply suspended by the proper suspending agent. Early examples of the technology include alcohol as the non-solvent, as in U.S. Pat. No. 3,894,880; however, alcohol may produce flammability which is not desirable in most cases. Other systems include the use of oils such as mineral oil and diesel oil as in U.S. Pat. No. 4,435,217 and U.S. Pat. No. 4,312,675. More recently gums have been suspended in aqueous solutions containing a high level of soluble salt as in U.S. Pat. No. 4,883,536; or in propylene glycol as taught in U.S. Pat. No. 5,246,490.

The best non-solvents for slurries are those based on the use of propylene glycol or polyethylene glycol because they are inert, nonflammable, and food approved products. The slurries can therefore be used in food applications as well as industrials such as paper coatings. The glycol non-solvent is usually combined with water and a polymeric suspending agent such as xanthan gum and the ratio of non-solvent to water is one which prevents solution of the suspended gum but will dissolve the suspending agent. Since there is a significant portion of water present there is some swelling of the gum particles even though they do not dissolve. The best solvent would consist of pure polyethylene glycol viscosified with a polymeric thickening agent; however, the commonly used viscosifiers such as xanthan gum, rhamsan gum, and cellulosic derivatives are not soluble in the polyethylene glycol.

SUMMARY

What is described herein is a stable, non-aqueous gum slurry which can be readily pumped or metered into a given formulation without swelling the gum or causing an excessive increase in viscosity. The slurry comprises a gum, a low molecular weight liquid polyethylene glycol as non-solvent, and, dissolved therein, a high molecular weight solid polyethylene glycol as viscosifier.

In a preferred form of the invention, there is described a slurry wherein the solid polyethylene glycol comprises 0.5–10% by wt. of the slurry, most preferably 1.0–2.5%.

Particularly desirable is a slurry wherein the low molecular weight polyethylene glycol has a molecular weight of about 200 to 600, and the high molecular weight polyethylene glycol has a molecular weight of about 20,000 for industrial use, or 8000 for food use.

Suitably the slurry includes about 20 to 60 wt. % of the gum.

DESCRIPTION OF THE INVENTION

The composition of this invention comprises a system based on 100% polyethylene glycol as the solvent. It has been discovered that the liquid forms of polyethylene glycol, i.e., those with molecular weights from 200 to 600 produced as Carbowax™ (Union Carbide), can be viscosified by higher molecular weight polyethylene glycols such as Carbowax™ 8000, (molecular weight 8000) particularly suitable for food grade applications, or Carbowax™ Compound 20M which has a molecular weight of about 20,000, suitable for industrial uses.

The process of the invention requires solution of the solid, high molecular weight polyethylene glycol in the liquid polyethylene glycol. The process requires heating of the solid Carbowax™ 8000 in the liquid polyethylene glycol, e.g. Carbowax™ 300, at a temperature equal to or greater than the melting point of the solid polyethylene glycol, followed by cooling with agitation. If some type of agitation is not present during the cooling process the result is a semi-solid mass similar to petroleum jelly and the gum suspension is not pumpable; however, by agitating while cooling the structure is broken and a viscous solution results. The viscous solution is capable of suspending fine mesh gum particles to produce an excellent slurry with good flowability and rapid solubility in water.

Any combination of solid and liquid polyethylene glycols can be mixed according to the invention; however, the most useful slurries are formed from mixtures of Carbowax™ 8000 and Carbowax™ polyethylene glycol 300. This selection is based on melting/freezing points of the two materials and the food approved status of both. A similar solvent system for industrial use only could also be Compound 20M dissolved in Carbowax™ 200. A useful concentration range of the solid Carbowax™ is 0.5–10% by weight of the slurry, with a preferred range of 1.0–2.5%.

Since the solvent employed in this invention is 100% polyethylene glycol, none of the common viscosifiers will dissolve in the composition and it is therefore useful for producing gum slurries of all the commonly used viscosifiers. These include alginates, xanthan gum, gellan gum, rhamsan gum, welan gum, guar gum, locust bean gum, gum tragacanth, gum ghatti, gum arabic, and the cellulose derivatives such as carboxymethyl cellulose, hydroxyethyl cellulose, and methyl celluloses. Other synthetic water soluble polymers such as the polyacrylamides could also be used. Some slurries have been made commercially but have not contained combinations of the present invention.

EXAMPLE 1

Preparation of 200 grams of a 40% alginate suspension was easily achieved by adding 80.0 grams of Kelvis®, a fine mesh sodium alginate, to a solution of 2.0 grams of Carbowax 8000 in 118 grams of Carbowax 300 which had been heated to 65° C. to dissolve the higher molecular weight polyethylene glycol. The suspension was stirred continuously while cooling to ambient temperature. A stable suspension with excellent flowability was produced. The same procedure was followed without stirring while cooling. This produced a product which contained a gelled layer of Carbowax on top of a gelled gum suspension, a product which would not be usable. Thus it is necessary to mix while cooling in order to obtain a viscous dispersion rather than a gel.

EXAMPLE 2

In order to prepare a slurry more rapidly, another technique can be used. A hot concentrate of the Carbowax 8000 in Carbowax 300 can be prepared and added to a cold dispersion of the gum in the Carbowax 300, e.g., the 40% slurry above was prepared by adding 80.0 grams of Kelvise to 100.0 grams of Carbowax 300 and 20 grams of a hot 10% solution of Carbowax 8000 in Carbowax 300 was added with agitation. Rapid cooling occurs and a viscous product is formed within minutes which has the same properties as the slurry produced in Example 1.

EXAMPLE 3

A 40% xanthan gum slurry was prepared in the same manner as Example 2. 80.0 grams of KELTROL F®, a fine mesh xanthan gum, were added to 100.0 grams of Carbowax 300 followed by 20.0 grams of a hot 10% concentrate of Carbowax 8000 in Carbowax 300. The xanthan gum slurry was very flowable with a viscosity of 7700 cP when measured on a Brookfield LVT viscometer using spindle #4 at 6 rpm.

EXAMPLE 4

45% and 50% slurries of both KELVIS® and KELTROL F® were prepared in the same manner. All slurries were flowable or pumpable and could be used as a gum source.

EXAMPLE 5

The same technique was used to produce a 40% slurry of carboxymethyl cellulose. 80.0 grams of CMC 7L (Aqualon) were added to 100 grams of Carbowax 300 followed by 20.0 grams of the hot concentrate described above. The slurry so produced was flowable and pumpable with a viscosity of 5200 cP when measured on a Brookfield LVT viscometer at 6 rpm.

The slurries are especially useful in applications where the gum is pumped or metered into a system, e.g. during the production of a paper coating, a paint, cementitious compounds, oil well drilling fluids, food and cosmetic products and the like. Any application where the gum is normally used is appropriate.

While the invention has been described with particular reference to certain embodiments thereof, it will be understood that changes and modifications may be made which are within the skill of the art. Accordingly, it is intended to be bound only by the following claims:

What is claimed is:

1. A stable, non-aqueous gum slurry which can be readily pumped or metered into a given formulation without swelling the gum or causing an excessive increase in viscosity, comprising about 20 to 60 wt. % of a gum, liquid polyethylene glycol as a non-solvent, and dissolved therein, 0.5–10% by wt. of solid polyethylene glycol as viscosifier.

2. A slurry according to claim 1 wherein said amount of solid polyethylene glycol is 1.0–2.5%.

3. A slurry according to claim 1 wherein said liquid polyethylene glycol has a molecular weight of about 200 to 600, and said solid polyethylene glycol has a molecular weight of about 8,000–20,000.

4. A slurry according to claim 3 wherein solid polyethylene glycol has a molecular weight of about 8,000.

* * * * *